United States Patent [19]
Kawashima

[11] Patent Number: 5,521,749
[45] Date of Patent: May 28, 1996

[54] OPTICAL MODULATION APPARATUS

[75] Inventor: Hisao Kawashima, Tokyo, Japan

[73] Assignee: NEC Corporation, Japan

[21] Appl. No.: 263,477

[22] Filed: Jun. 22, 1994

[30] Foreign Application Priority Data

Jun. 25, 1993 [JP] Japan ............................ 5-154075

[51] Int. Cl.⁶ ............................................ G02F 2/00
[52] U.S. Cl. ...................... 359/325; 359/187; 250/227.21
[58] Field of Search ............................ 332/155, 156, 332/157; 250/227.21; 359/187, 276, 325

[56] References Cited

U.S. PATENT DOCUMENTS

| 4,162,398 | 7/1979 | Kayanuma | 250/205 |
| 5,054,116 | 10/1991 | Davidson | 332/157 |

FOREIGN PATENT DOCUMENTS

| 185557 | 6/1986 | European Pat. Off. . |
| 56-165122 | 12/1981 | Japan . |
| 58-68250 | 4/1983 | Japan . |
| 59-17527 | 1/1984 | Japan . |

OTHER PUBLICATIONS

*Patent Abstracts of Japan*, vol. 15, No. 449 (P–1275), Nov. 14, 1991; JP–A–03 189616, Aug. 19, 1991.

Primary Examiner—Georgia Y. Epps
Assistant Examiner—Thomas Robbins
Attorney, Agent, or Firm—Ostrolenk, Faber, Gerb & Soffen

[57] ABSTRACT

In accordance with a mean value of a modulated light supplied from an optical modulator utilizing electro-optic effect, the drift amount of voltage light output characteristics (an operative point voltage of the optical modulator) is obtained. When the operative point voltage becomes over $E_{CNT}$ or below $-E_{CNT}$, that is, it is out of a voltage range of $-E_{CNT}$ to $E_{CNT}$, a bias voltage is controlled to have a different polarity and a voltage difference which is less than a predetermined value from the operative point voltage. The direction of the DC drift is changed dependent on the polarity of the bias voltage. Therefore, the operative point voltage is maintained within a predetermined voltage range without suspending the communication operation by controlling the bias voltage as described above.

7 Claims, 9 Drawing Sheets

OPTICAL MODULATION APPARATUS

FIELD OF THE INVENTION

The invention relates to an optical modulation apparatus, and more particularly, to an apparatus for compensating the occurrence of drift in voltage light output characteristics in an optical modulator.

BACKGROUND OF THE INVENTION

These days, an optical fiber communication system in which information can be transmitted with high speed as compared to a coaxial cable communication system has been introduced into a market to meet the demand of transmitting a large capacity of information. The modulation method presently used in an optical fiber communication system is an optical direct modulation method in which a drive current of a light source such as a semiconductor laser, etc. is modulated to directly modulate an intensity of an emitted light. In this direct modulation method, there is limitation in amount of information to be transmitted in a unit time, because the Chirping phenomenon is not negligible as a modulation frequency becomes demand of transmitting a much more increased amount of information, an optical modulator utilizing the electro-optic effect in which a refractive index of a material is changed by applying an electric field to the material has been researched and developed.

Although an optical modulator in which high speed modulation is possible to be carried out in principle, drift of voltage light output characteristics in which a light output waveform is distorted occurs as operation of the modulation continues. As a result, demodulation is difficult to provide a precise demodulated signal from a received light signal.

In order to cope with the disadvantage of drift as described above, a conventional optical modulation apparatus comprising a mean value detecting circuit for calculating a mean value of a modulated light from an optical modulator utilizing the electro-optic effect, a voltage comparing circuit for comparing the mean value with the reference voltage to provide a difference signal therebetween, and a bias voltage generating circuit for generating a bias voltage dependent on the difference signal has been proposed.

In the conventional optical modulation apparatus, the bias voltage generated dependent on the difference signal is added to a modulating signal, and an added signal thus obtained is supplied to the optical modulator. In this operation, the bias voltage is controlled to be coincided with an operative point voltage of the optical modulator to suppress the distortion in waveforms of output lights caused by the drift.

Other than the above described conventional optical modulation apparatus, the Japanese Patent Kokai No. 59-17527 has described a bias voltage control apparatus for an optical modulator comprising a circuit for detecting a difference of duty-cycles between an input modulating signal and a modulated light, and a circuit for controlling a bias voltage dependent on the difference to make the bias voltage coincident with an operative point voltage of the optical modulator. In addition, the Japanese Patent Kokai No. 56-165122 has described a method for preventing DC drift from occurring in an optical modulator or an optical polarizer by dividing a buffer layer, and the Japanese Patent Kokai No. 58-68250 has described an optical modulation apparatus in which an output light of an optical modulator and a smoothed signal of the output light are compared to control a bias voltage dependent on a difference therebetween.

In the conventional optical modulation apparatus, however, there is a disadvantage in that the modulation operation is required to be temporally suspended for the re-setting of a bias voltage prior to the occurrence of the situation where a controlled bias voltage is over a break-down voltage of the optical modulator. This results in the consequence that the modulation operation continues successively for 10 years of an operation warrant period for an optical communication apparatus. The technologies of the above described Japanese Patent Kokais result in the similar disadvantages.

In order to overcome the disadvantage of the break-down voltage, there has been proposed a method in which a bias voltage is re-set to be a lower one by subtracting value corresponding to one period from a higher one, when the bias voltage is over a predetermined value, because voltage light output characteristics are periodical in regard to voltage. Even in this method, there is the same disadvantage in that the modulation operation is temporality suspended at the re-setting time of the bias voltage.

SUMMARY OF THE INVENTION

Accordingly, it is an object of the invention to provide an optical modulation apparatus in which optical modulation is successively carried out for a desired long time.

It is a further object of the invention to provide an optical modulation apparatus in which optical modulation is stably effected without any complicated control.

According to the invention, an optical modulation apparatus, comprises:

an optical modulator for modulating an input light in accordance with a modulating signal and a bias voltage to supply a modulated light by utilizing electro-optic effect;

an optical device for generating an electric signal dependent on the modulated light by receiving a part of the modulated light;

an operative point voltage detecting unit for detecting an operative point voltage in accordance with the electric signal, the optical modulator supplying the modulated light which is half a maximum light output by receiving the operative point voltage; and a bias voltage supplying unit for supplying the bias voltage to the optical modulator, the bias voltage having a first polarity different from a second polarity, when the operative point voltage is changed from a first case where it is in a first predetermined voltage range to a second case where it is out of the first predetermined voltage range, and having had the second polarity, when the operative point voltage was in the first case, and a difference between the bias voltage and the operative point voltage being in a second predetermined voltage range, whereby the modulating signal is demodulated from the modulated light in a light receiving apparatus.

BRIEF DESCRIPTION OF THE DRAWINGS

The invention will be explained in more detail in conjunction with appended drawings, wherein.

DESCRIPTION OF THE PREFERRED EMBODIMENT

Before explaining an optical modulation apparatus in preferred embodiments according to the invention, the aforementioned conventional optical modulation apparatus will be explained.

Figure 1:
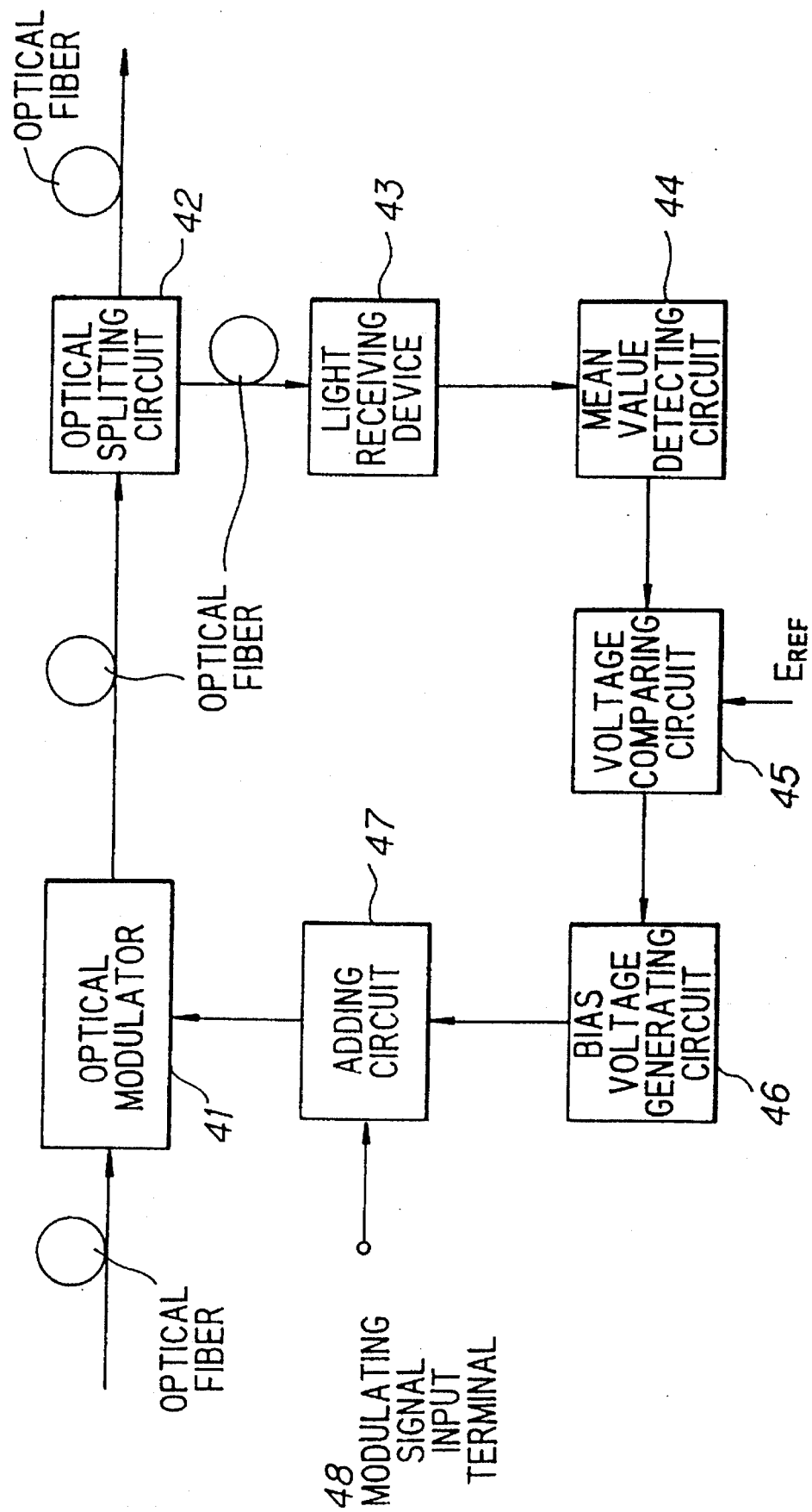
FIG. 1 is a block diagram showing a conventional optical modulation apparatus.

FIG. 1 shows the conventional optical modulation apparatus which comprises an optical modulator 41 for modulating an input light signal to provide a modulated light by a modulating signal, an optical splitting circuit for splitting the modulated light into first and second modulated lights, a light receiving device 43 for generating an electric signal by receiving the first modulated light, a mean value detecting circuit 44 for calculating a mean value by receiving the electric signal, a voltage comparing circuit 45 for comparing the mean value and a reference voltage $E_{REF}$ which is a mean value obtained when a bias voltage which is a direct current component of the modulating signal is equal to an operative point voltage of the optical modulator 41 which is half the maximum light output of the optical modulator 41, a bias voltage generating circuit 46 for generating a bias voltage which is changed by a difference between the mean value and the reference voltage $E_{REF}$, and an adding circuit 47 for adding a modulating signal supplied at a modulating signal input terminal 48 and a bias voltage supplied from the bias voltage generating circuit 46.

In the optical modulation apparatus, an input light is modulated in the optical modulator 41 in accordance with electro-optic effect, and a light thus modulated is split into the first and second modulated lights by the optical splitting circuit 42.

The first modulated light is converted into an electric signal dependent on the intensity of the modulated light by the light receiving device 43, and the mean value of the electric signal is calculated in the mean value detecting circuit 44.

Then, the mean value is compared with the reference voltage $E_{REF}$ in the voltage comparing circuit 45, from a difference signal dependent on the difference between the mean value and the reference voltage $E_{REF}$ is supplied to the bias voltage generating circuit 46. Thus, a bias voltage which is changed dependent on the difference signal is generated in the bias voltage generating circuit 46, so that the bias voltage is made coincident to the operative point voltage. The bias voltage thus generated is added in the adding circuit 47 with the modulating signal supplied from the input terminal 48, and a voltage thus obtained is supplied from the adding circuit 48 to the optical modulator 41.

Figure 2:
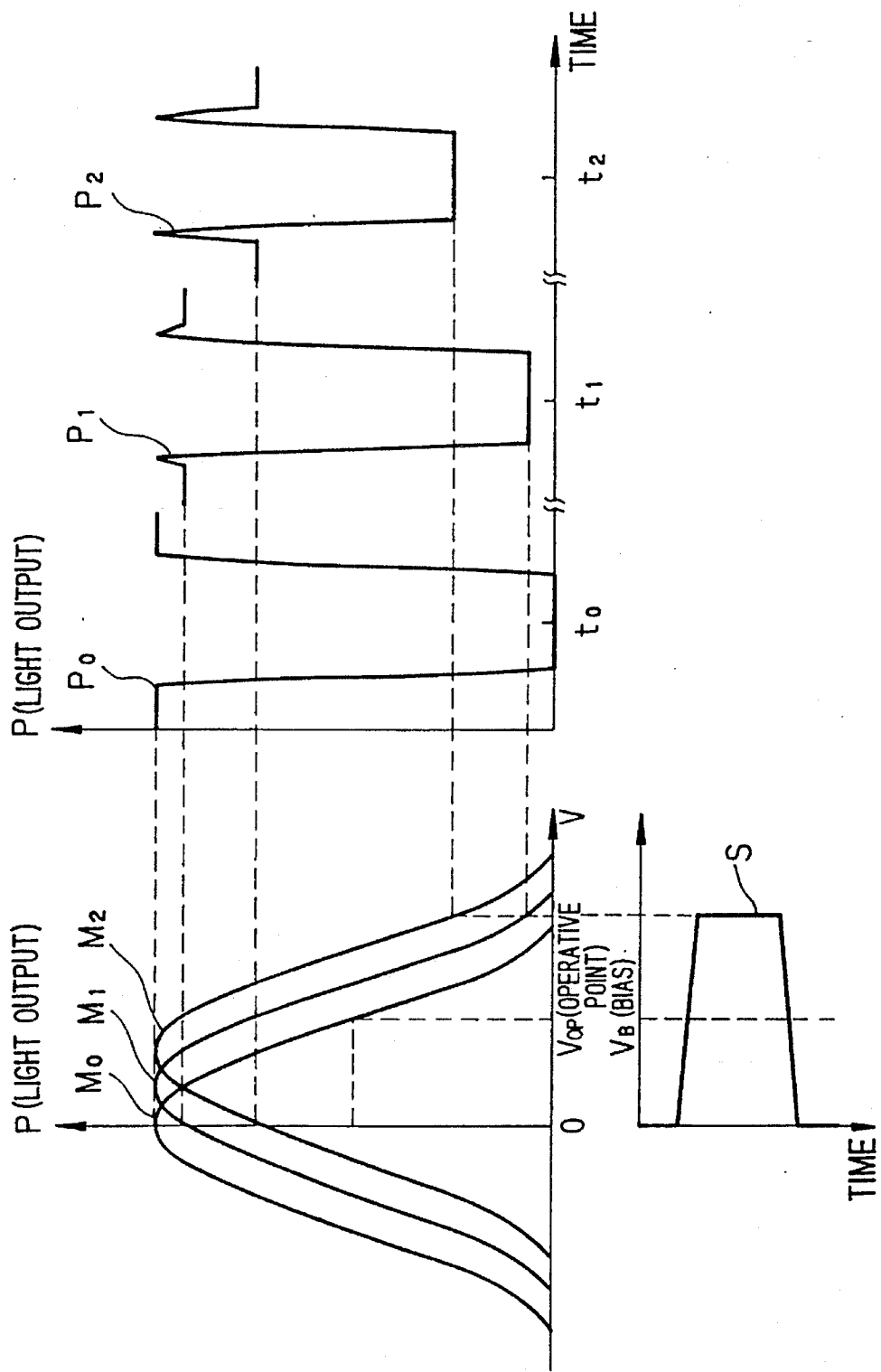
FIG. 2 is a diagram showing the relation of voltage light output characteristics of an optical modulator utilizing the electro-optic effect to light outputs thereof.

FIG. 2 shows the relation of a light signal to voltage light output characteristics, wherein curves $M_0$, $M_1$ and $M_2$ indicate light outputs $P_0$, $P_1$ and $P_2$ relative to voltages V at times $t_0$, $t_1$ and $t_2$ in accordance with a fixed modulating signal S, and the reference signs $V_{OP}$ and $V_B$ indicate an operative point voltage and a bias voltage. As clearly shown therein, the voltage light output characteristics drift dependent on time. In a light receiving apparatus for demodulating a modulated light transmitted from an optical modulation apparatus, for instance, as shown in FIG. 1, the demodulating of a received light is carried out in the assumption that the operative point voltage $V_{OP}$ and the bias voltage $V_B$ are coincident. For this reason, if waveforms of the light outputs $P_0$, $P_1$ and $P_2$ are distorted largely, it is difficult that the received light is correctly demodulated. Such drift of the voltage-light output characteristics is defined DC (direct current) drift, and the case shown in FIG. 2 is that the drift occurs in the positive direction relative to a positive bias voltage. On the other hand, drift may occur in the negative direction in accordance with structure and fabrication conditions of an optical modulator. The mechanism for causing drift in an optical modulator to occur has not been clarified so far, and an optical modulator having no DC drift has not been developed to be fabricated.

In order to cope with the drift, a control unit comprising the mean value detecting circuit 44, the voltage comparing circuit 45 and the bias voltage generating circuit 46 is provided in the optical modulation apparatus as shown in FIG. 1.

Next, an optical modulation apparatus in the first preferred embodiment according to the invention will be explained FIGS. 3 to 5.

Figure 3:
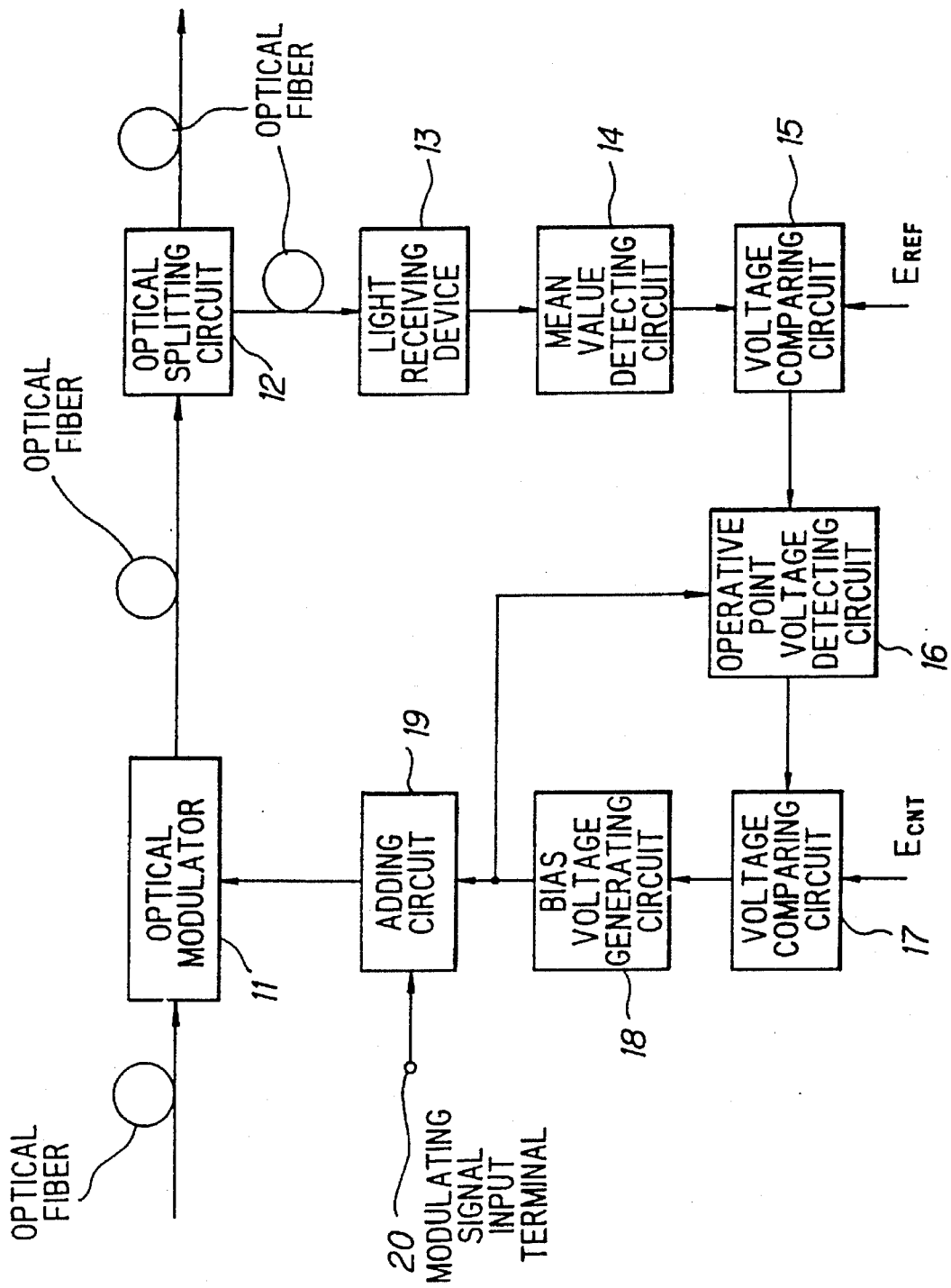
FIG. 3 is a block diagram showing an optical modulation apparatus in a first preferred embodiment according to the invention.
Figure 5A:
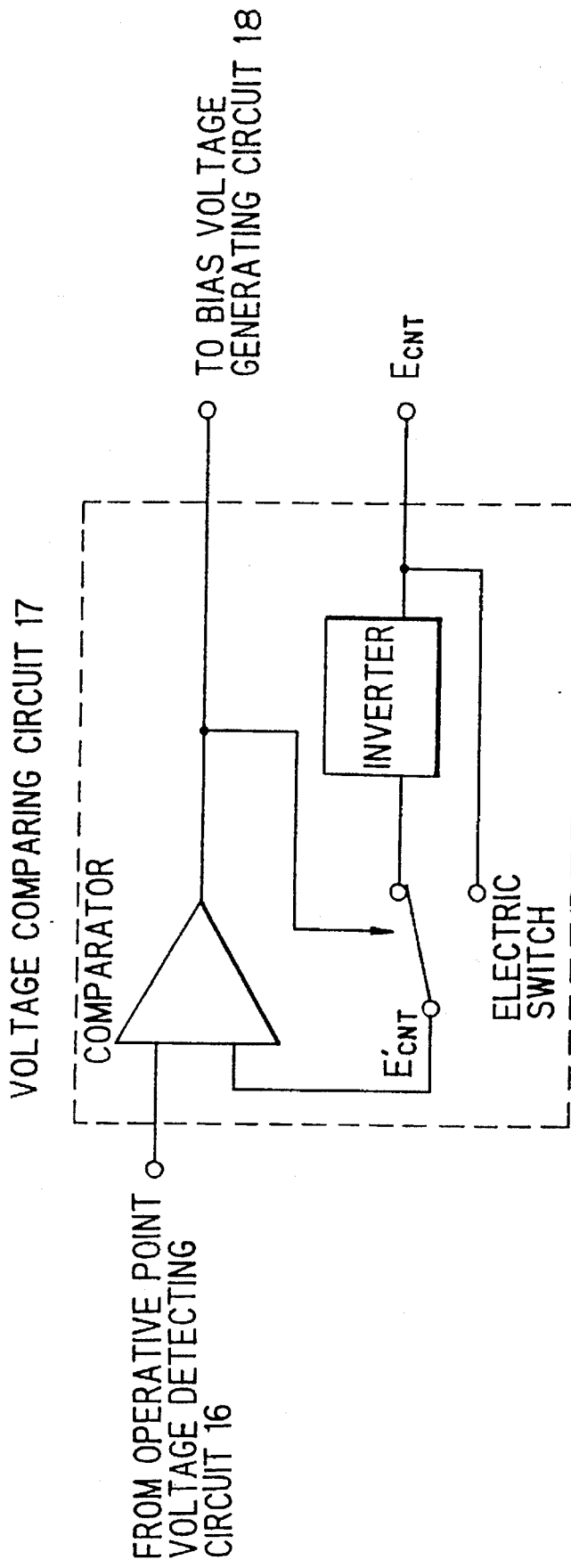

In FIG. 3, the an optical modulation apparatus comprises an optical modulator 11, an optical splitting circuit 12, a light receiving device 13, a mean value detecting circuit 14, a first voltage comparing circuit 15, an operative point detecting circuit 16, a second voltage comparing circuit 17, a bias voltage generating circuit 18, and an adding circuit 19. In the optical modulation apparatus, the optical modulator 11 is a Mach-Zender type optical modulator having an operative point voltage in the vicinity of zero V, the first voltage comparing circuit 15 is an operational amplifier having an amplification factor which is set such that a difference of two inputs is a difference of the operative point voltage and a bias voltage and supplying an output voltage signal which is a difference between a presently used bias voltage and a presently detected operative point voltage calculated by a difference of an input signal supplied from the mean value detecting circuit 14 and a reference voltage $E_{REF}$, and zero V at the time when an operative point voltage is coincided with a bias voltage, the operative point voltage detecting circuit 16 is an operational amplifier operating as an adding circuit and supplying an output voltage signal of a presently detected operative point voltage, the second voltage comparing circuit 17 is composed of a comparator, an analog inverter and an electric switch, as shown in FIG. 5A, wherein an output signal (the presently detected operative point voltage) of the operative point detecting circuit 16 and a voltage signal $E'_{CNT}$ are supplied to the comparator, from which a control signal "high" is obtained, when the presently detected voltage is equal to or greater than the voltage signal $E'_{CNT}$, and the control signal "low" is obtained, when the presently detected voltage is less than the voltage signal $E'_{CNT}$, and the "high" or "low" signal is supplied to the bias voltage generating circuit 18 and the electric switch which is thereby controlled to supply a positive signal $E'_{CNT}$ not passing through the analog inverter as the voltage signal $E'_{CNT}$ in accordance with the input of the voltage signal $E_{CNT}$ at the time when the control signal is high, and a negative voltage signal-$E_{CNT}$ inverted by the analog inverter as the voltage signal $E'_{CNT}$ at the time of the control signal is low, and the bias voltage generating circuit 18 is composed of a power supply $E_B$, an analog inverter and an electric switch to supply an output voltage signal of $E_B$ not passing through the analog inverter when an output signal of the second voltage comparing circuit 17 is high, and the output voltage signal of $E_B$ inverted by the analog inverter when the output signal of the second voltage comparing circuit 17 is low.

Figure 4A:
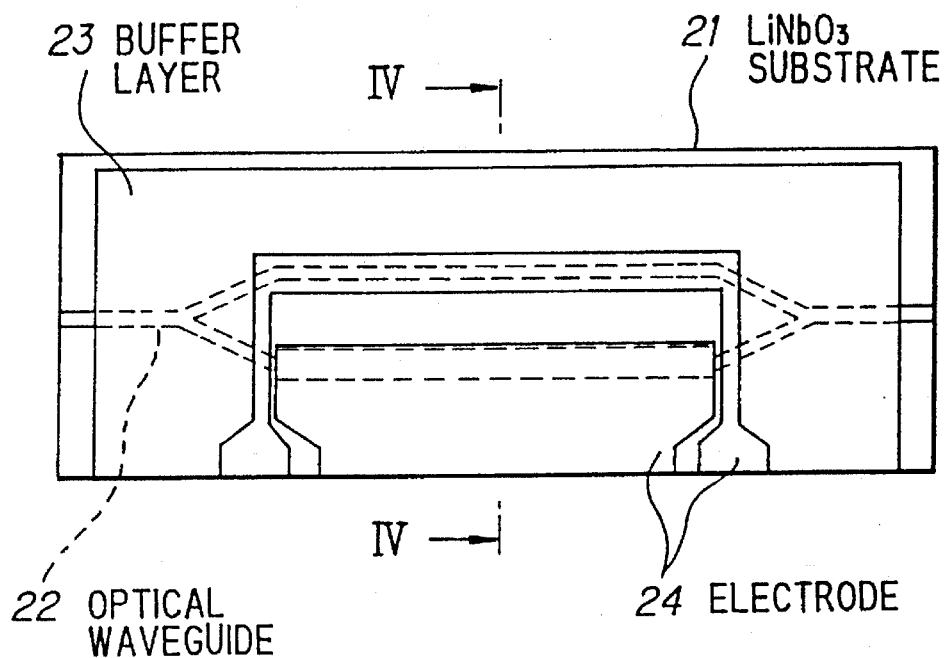
FIG. 4A is an explanatory diagram showing a Mach-Zender type optical modulator used in the first preferred embodiment.
Figure 4B:
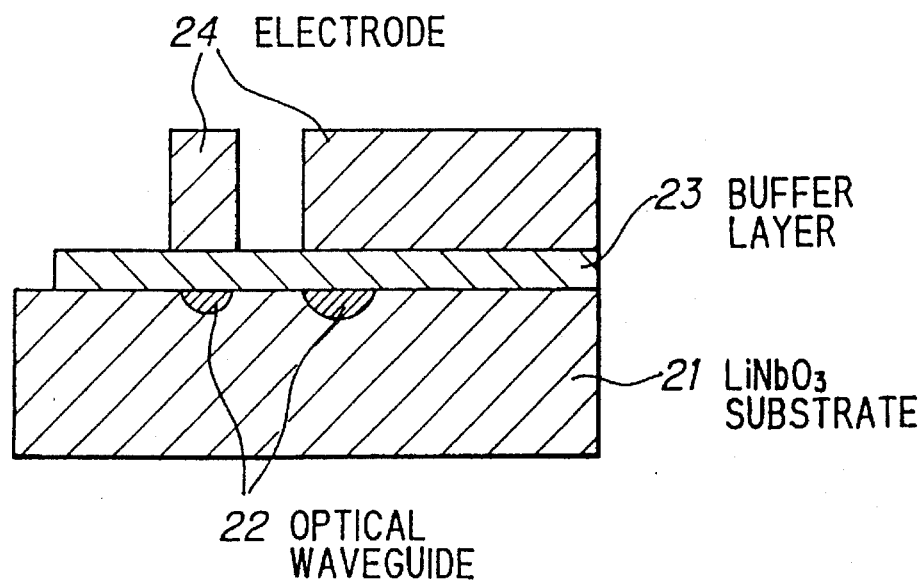
FIG. 4B is a cross-sectional view taken along the line IV—IV in FIG. 4A, FIGS. 5A and 5B are block diagrams showing a voltage comparing circuit and a bias voltage generating circuit in the first preferred embodiment.

FIGS. 4A and 4B show the optical modulator 11 which comprises a lithium niobate (LiNbO$_3$) substrate 21 having the electro-optic effect, waveguides 22 formed by thermally diffusing Ti into the substrate 21, a buffer layer 23 of a SiO$_2$ film, and electrodes 24 of An, wherein one of the waveguides 22 is wider and deeper than the other one to make an operative point voltage proximate to zero V. Actually, the operative point voltage is 0.15 V.

Figure 5B:
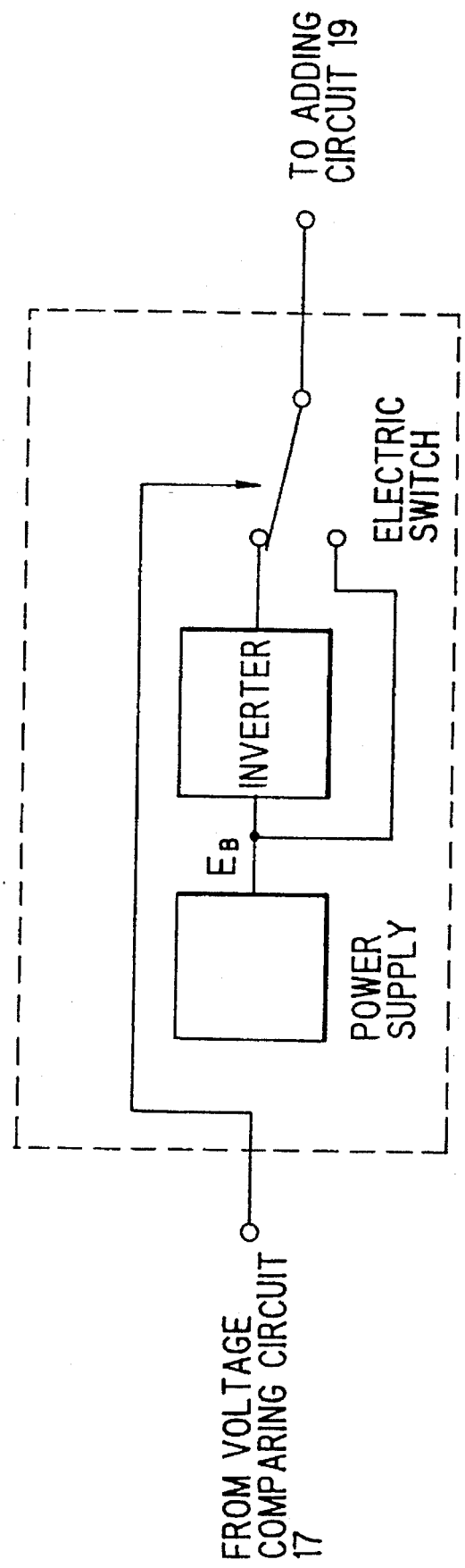

Operation of the optical modulation apparatus as shown in FIGS. 3 to 5 will be explained.

A modulated light is supplied from the optical modulator 11 to the optical splitting circuit 12, in which the modulated light is split into first and second modulated lights.

The first modulated light is received in the light receiving circuit 13, from which an electric signal converted from the first modulated light is supplied to the mean value detecting circuit 14. A mean value of the electric signal is calculated in the mean value detecting circuit 14, and the mean value is supplied to the first voltage comparing circuit 15, in which the mean value and a reference voltage $E_{REF}$ which is a mean value of a light output signal to be obtained when an operative point voltage and a bias voltage are coincided are compared to calculate a difference between the operative point voltage and the bias voltage. The difference is supplied from the first voltage comparing circuit 16 to the operative point voltage detecting circuit 16 together with a bias voltage supplied from the bias voltage generating circuit 18, so that an operative point voltage of the present time is obtained in the operative point voltage detecting circuit 16. In the second voltage comparing circuit 17, the operative point voltage is monitored by a predetermined time interval, and, when the operative point voltage is changed from a value greater than $-E_{CNT}$ to a value less than $-E_{CNT}$, and a from a value less than $E_{CNT}$ to a value greater than $E_{CNT}$, a control signal is generated to be supplied to the bias voltage generating circuit 18. When the control signal is detected in the bias voltage generating circuit 18, the polarity of a bias voltage generated in the bias voltage generating circuit 18 is inverted to be $E_B$ or $-E_B$ which is supplied to be added in the adding circuit 19 to a modulating signal supplied from an input terminal 20. The added signal is supplied to the optical modulator 11, in which an input light is modulated to be a modulated output light.

The input voltage $E_{CNT}$ for the second voltage comparing circuit 17 and the bias voltage $E_B$ in the bias voltage generating circuit 18 have a below relation to the maximum voltage difference $\Delta E$ between an operative point voltage and a bias voltage, even by which an appropriate output light is obtained in operation of the optical modulator 11.

$$E_{CNT}+E_B \leq \Delta E \quad (1)$$

When $E_{CNT}$ and $E_B$ meet the above relation (1), a difference voltage between an operative point voltage and a bias voltage is kept within the voltage difference $\Delta E$, even if the bias voltage is set to be $E_B$ or $-E_B$, as long as the operative voltage is in a range of $-E_{CNT}$ to $E_{CNT}$. Consequently, it is possible that a modulating signal is demodulated from a light which is received in a light receiving apparatus.

On the experimental basis, the maximum voltage difference $\Delta E$ is set to be 0.5 V in the optical modulation apparatus in the first preferred embodiment. Therefore, the relation (1) is defined by a below relation (2).

$$E_{CNT}+E_B \leq 0.5 \quad (2)$$

By way of example, $E_{CNT}$ and $E_B$ are set by an equation (3)

$$E_{CNT}=E_B=0.2V \quad (3)$$

As described before, the operative point voltage is 0.15 V in the optical modulator 11.

Under the condition, the modulation operation starts in the optical modulation apparatus. In the optical modulator 11, the direction of drift occurring due to the application of a positive bias voltage is positive, so that the operative point voltage is increased as time elapses. When the operative point voltage is detected in the second voltage detecting circuit 17 to be over $E_{CNT}$ (=0.2 V), a control voltage is supplied to the bias voltage generating circuit 18 by the second voltage comparing circuit 17, so that the bias voltage is changed from $E_B$ (=0.2 V) to $-E_B$ (=0.2 V).

When the polarity of the bias voltage is changed, the DC drift is changed in its direction. Therefore, the operative point voltage is decreased as time elapses. Thus, when the operative point voltage is less than $-E_{CNT}$ (=-0.2 V), a control signal is supplied to the bias voltage generating circuit 18 by the second voltage comparing circuit 17, so that the DC drift is changed in direction to be positive. Such control is repeated to set the operative point voltage in a predetermined voltage range. Thus, a voltage difference between an operative point voltage and a bias voltage is constantly kept within the tolerable value $\Delta E$, so that a modulating signal is precisely obtained in accordance with the demodulation of a received light.

Figure 6:
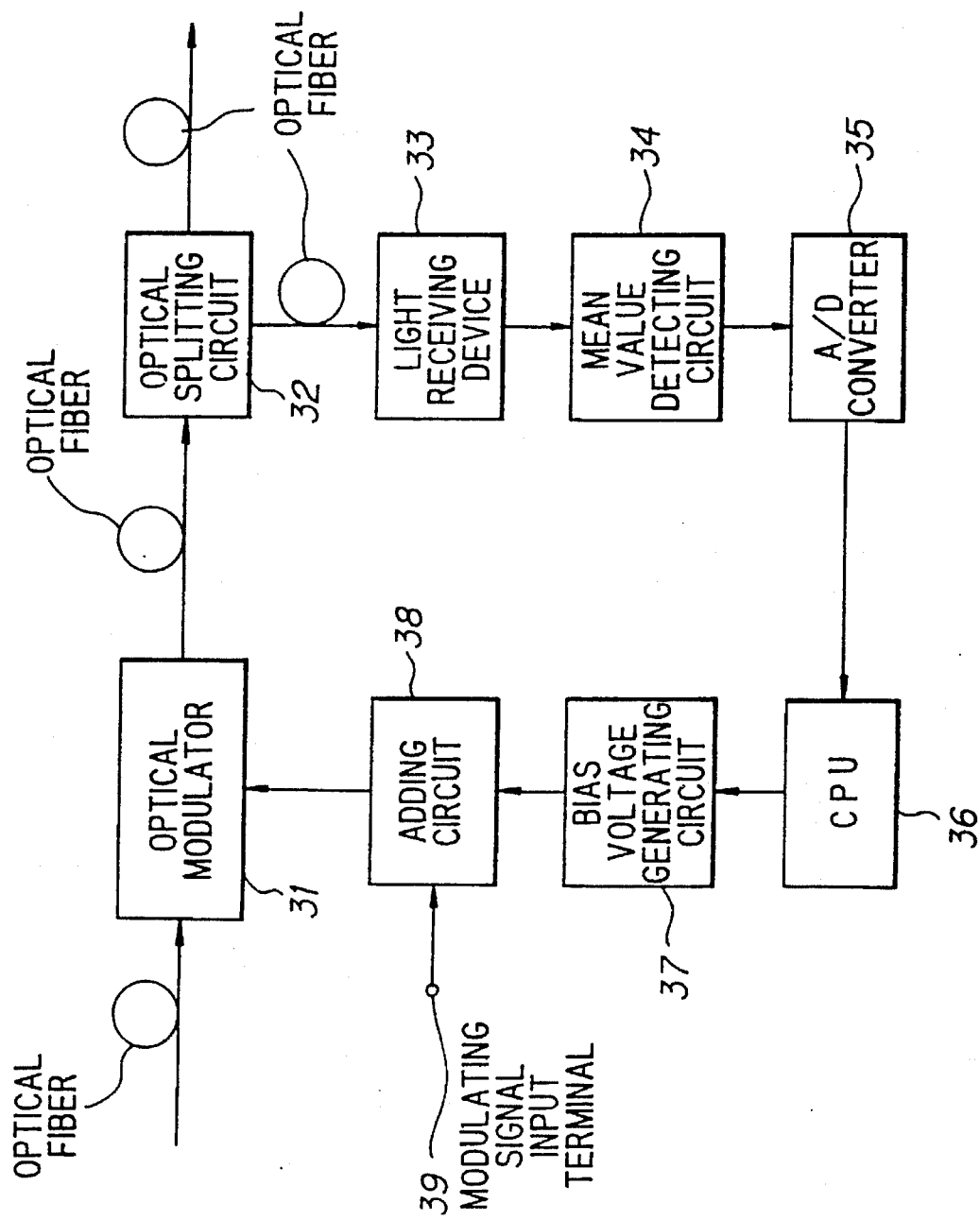
FIG. 6 is a block diagram showing an optical modulation apparatus in a second preferred embodiment according to the invention.

FIG. 6 shows an optical modulation apparatus in the second preferred embodiment according to the invention.

The optical modulation apparatus comprises an optical modulator 31, an optical splitting circuit 32, a light receiving device 33, a mean value detecting circuit 34, an A/D (analog to digital) converter 35, a CPU (central processing unit) 36, a bias voltage generating circuit 37, and an adding circuit, wherein the optical modulator 31 is a Mach-Zender type optical modulator as explained in the first preferred embodiment.

In this optical modulation apparatus, a part of a light supplied from the optical modulator 31 is supplied to the light receiving device 33 by the optical splitting circuit 32, and an electric signal is generated dependent on a received light in the light receiving device 33. Then, the electric signal is calculated to provide a mean value by a predetermined time interval, and the mean value is converted in the A/D converter 35 from a analog data to a digital data which is supplied to the CPU 36.

In the CPU 36, the relation of light signal mean values, and voltage differences between bias voltages and operative point voltages is stored, so that an operative point voltage is obtained in accordance with a supplied mean value, and the bias voltage generating circuit 37 is controlled to generate a bias voltage corresponding to the operative point voltage, as explained later by a flow chart in FIG. 7. Thus, the bias voltage generated in the bias voltage generating circuit 37 is added in the adding circuit 38 with a modulating signal supplied at a modulating signal input terminal 39, and the added signal is supplied to the optical modulator 31.

Figure 7:
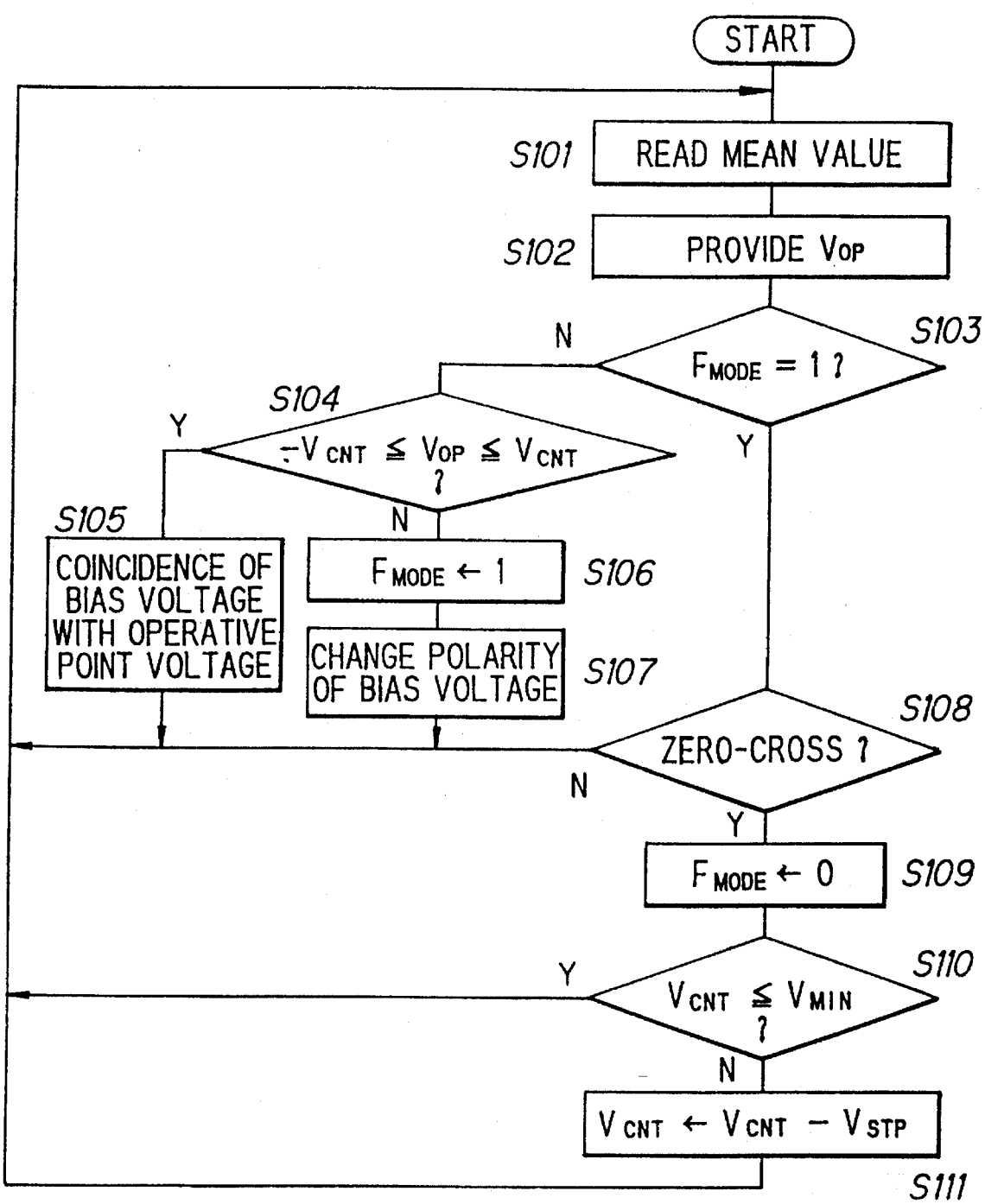
FIG. 7 is a flow chart explaining operation of a CPU in the second preferred embodiment.

In the control flow as shown in FIG. 7, control parameters of $V_{CNT}$, $V_{MIN}$ and $V_{STP}$ are used, wherein the parameter $V_{CNT}$ corresponds to $E_{CNT}$ and $E_B$ in the first preferred embodiment, and is set to be half the value of $\Delta E$ in the first preferred embodiment, $V_{MIN}$ is a voltage for a control range of an operative point voltage, and $V_{STP}$ is a voltage for narrowing the control range of an operative point voltage step by step.

In the CPU 36, the mean value is read from the A/D converter 35 at the step S101, and an operative point voltage $V_{OP}$ of the present time is obtained corresponding to the mean value at the step S102. Next, it is determined at the step S103 whether on operation mode flag $F_{MODE}$ is "1" or not, wherein the operation mode flag $F_{MODE}$ is "1" in an operation point voltage, while the operation mode flag $F_{MODE}$ is "0" in an operation mode of following a bias voltage to an operative point voltage.

At the step S103, when No is met ($F_{MODE}=0$), it is determined at the step S104 whether the operative point voltage $V_{OP}$ is in a control range of $-V_{CNT}$ to $V_{CNT}$ or not. At the step S104, when YES is met, a bias voltage is controlled to be coincided with the operative point voltage at the step S105, and the control returns to the step S101. On the other hand, when No is met at the step S104, the operation mode flag $F_{MODE}$ is changed to be "1" at the step S106, and the polarity of the bias voltage is inverted by controlling the bias voltage generating circuit 37 at the step S107. Then, the control returns to the step S101.

At the step S103, when Yes is met ($F_{MODE}=1$), it is determined at the step S108 whether the signs of the former operative point voltage and the present operative point voltage are different, or the present operative point voltage is zero.

When No is met at the step S108, that is, when the signs are same between the present and former operative point voltages, the control returns to the step S101. On the other hand, Yes is met at the step S108, that is, when the operative point voltage crosses zero V, the operation mode flag $F_{MODE}$ is controlled to be "0" at the step S109, and the operation mode is changed to be a mode in which a bias voltage is controlled to be an operative point voltage. At the step S110, when $V_{CNT}$ is equal to or greater than $V_{MIN}$, $V_{CNT}$ is decreased at the step S111 by $V_{STP}$, and the control returns to the step S101.

In the second preferred embodiment, the operative point voltage and the bias voltage are controlled, so that a difference therebetween is less than $2V_{MIN}$.

Figure 8:
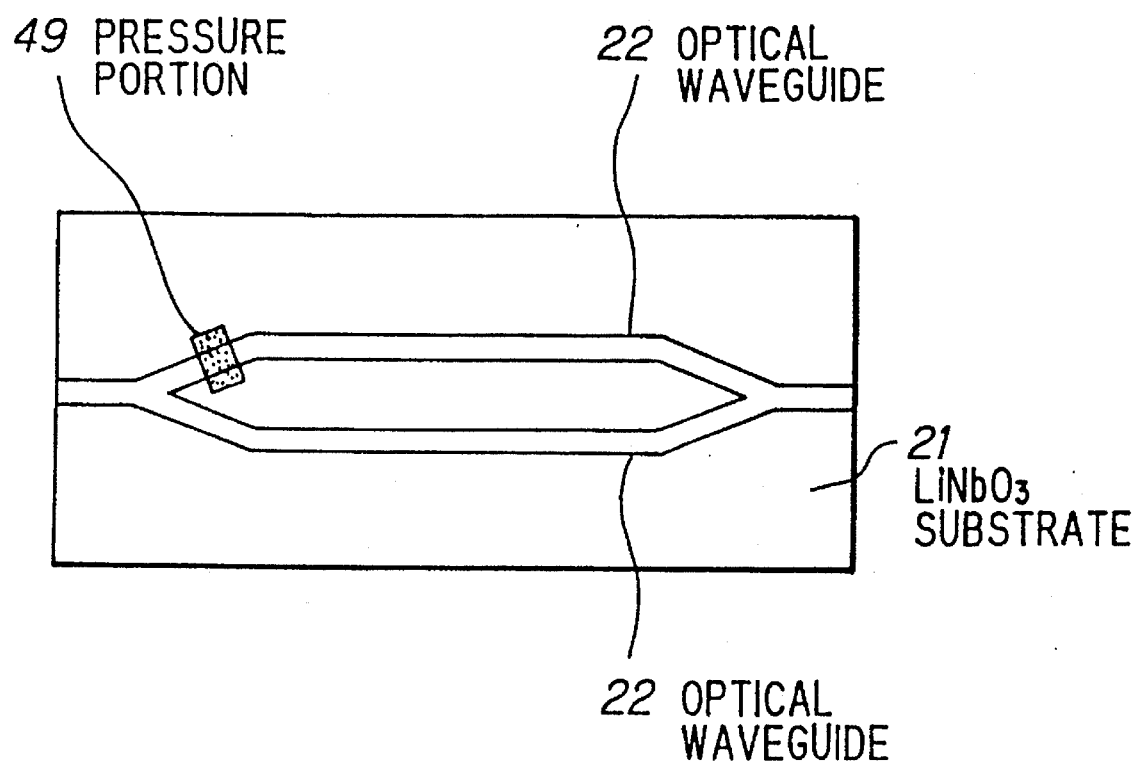
FIG. 8 is an explanatory diagram showing an optical waveguide device having a pressure portion thereon to be used in the preferred embodiments.

In the first and second preferred embodiments, the optical modulator as shown in FIGS. 4A and 4B may be replaced by an optical modulator as shown in FIG. 8. the replacing optical modulator comprises a LiNbO$_3$ substrate 21, optical waveguides 22, and a pressure portion 49 for pressing one of the optical waveguides 22. In this optical modulator, an operative point voltage is in the vicinity of 0(zero) V in the provision of the pressure portion 49.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An optical modulation apparatus, comprising:
   an optical modulator for modulating an input light in accordance with a modulating signal and a bias voltage to supply a modulated light by utilizing electro-optic effect;
   an optical device for generating an electric signal dependent on said modulated light by receiving a part of said modulated light;
   an operative point voltage detecting unit for detecting an operative point voltage in accordance with said electric signal, said optical modulator supplying said modulated light which is half a maximum light output by receiving said operative point voltage; and
   a bias voltage supplying unit for supplying said bias voltage to said optical modulator, said bias voltage having a first polarity different from a second polarity, when said operative point voltage is changed from a first case where it is in a first predetermined voltage range to a second case where it is out of said first predetermined voltage range, and having had said second polarity, when said operative point voltage was in said first case, and a difference between said bias voltage and said operative point voltage being in a second predetermined voltage range, whereby said modulating signal is demodulated from said modulated light in a light receiving apparatus.

2. An optical modulation apparatus, according to claim 1, wherein:
   said operative point voltage detecting unit, comprises:
   a mean value detecting circuit for detecting a mean value of said modulated light by receiving said electric signal;
   a first voltage comparing circuit for generating a voltage difference between said bias voltage and said operative point voltage by receiving said mean value and a predetermined reference voltage; and
   an operative point voltage detecting circuit for generating said operative point voltage by receiving said voltage difference and said bias voltage; and
   said bias voltage generating unit, comprises:
   a second voltage comparing circuit for generating a control signal by detecting said operative point voltage to be out of said first predetermined voltage range; and
   a bias voltage generating circuit for generating said bias voltage having a polarity between said first and second polarities changed by said control signal.

3. An optical modulation apparatus, according to claim 2, wherein:
   said second voltage comparing circuit, comprises:
   a comparator for generating said control signal by comparing said operative point voltage and a comparing reference voltage; and
   an inverter for inverting a polarity of said comparing reference voltage dependent on said control signal; and
   said bias voltage generating circuit, comprises:
   a power supply for generating a constant voltage; and
   an inverter for inverting a polarity of said constant voltage dependent on said control signal to generate said bias voltage.

4. An optical modulation apparatus, according to claim 2, wherein:

said first voltage comparing circuit, said operative point voltage detecting circuit, and said second voltage comparing circuit are composed of a microprocessor storing an operative program and an operative data.

5. An optical modulation apparatus, comprising:

an optical modulator for modulating an input light in accordance with a modulating signal and a bias voltage to supply a modulated light by utilizing electro-optic effect, said optical modulator comprising a $LiNbO_3$ substrate, first and second parallel optical waveguides formed on said substrate, a buffer layer formed on said optical waveguides and said substrate, and first and second electrodes provided on said buffer layer to correspond to said first and second parallel optical waveguides;

an optical device for generating an electric signal dependent on said modulated light by receiving a part of said modulated light;

an operative point voltage detecting unit for detecting an operative point voltage in accordance with said electric signal, said optical modulator supplying said modulated light which is half a maximum light output by receiving said operative point voltage; and a bias voltage supplying unit for supplying said bias voltage to said optical modulator, said bias voltage having a first polarity different from a second polarity, when said operative point voltage is changed from a first case where it is in a first predetermined voltage range to a second case where it is out of said first predetermined voltage range, and having had said second polarity, when said operative point voltage was in said first case, and a difference between said bias voltage and said operative point voltage being in a second predetermined voltage range, whereby said modulating signal is demodulated from said modulated light in a light receiving apparatus.

6. An optical modulation apparatus, according to claim 5, wherein:

said optical modulator has said operative point voltage which is nearly zero V in accordance with a structure in which said second optical waveguide is wider than said first optical waveguide.

7. An optical modulation apparatus, according to claim 5, wherein:

said optical modulator has said operative point voltage which is nearly zero V in accordance with a structure in which said first optical waveguide is pressed at a pressure portion.

* * * * *